United States Patent
Chen et al.

(10) Patent No.: US 10,187,469 B2
(45) Date of Patent: Jan. 22, 2019

(54) CLOUD AGENT DEVICE, CLOUD STORAGE AND FILE TRANSFERRING METHOD

(71) Applicant: NINNING FUGUI PRECISION INDUSTRIAL CO., LTD., Nanning (CN)

(72) Inventors: Hong-Kai Chen, New Taipei (TW); Shih-Pin Chen, New Taipei (TW); Chih-Wei Tung, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 283 days.

(21) Appl. No.: 14/956,288

(22) Filed: Dec. 1, 2015

(65) Prior Publication Data
US 2016/0156616 A1    Jun. 2, 2016

(30) Foreign Application Priority Data
Dec. 2, 2014  (TW) .............................. 103141695 A

(51) Int. Cl.
  H01L 29/08    (2006.01)
  H04L 29/08    (2006.01)

(52) U.S. Cl.
  CPC .......... *H04L 67/1097* (2013.01); *H04L 67/06* (2013.01)

(58) Field of Classification Search
  CPC .... H04L 67/1097; H04L 67/06; H04L 63/083
  See application file for complete search history.

(56) References Cited

U.S. PATENT DOCUMENTS

| 8,762,642 | B2 | 6/2014 | Bates et al. | |
| 9,032,081 | B1* | 5/2015 | North | H04L 67/1006 709/225 |
| 2012/0278504 | A1* | 11/2012 | Ang | H04L 61/2596 709/246 |
| 2013/0111604 | A1 | 5/2013 | Huang et al. | |
| 2013/0332575 | A1 | 12/2013 | Song et al. | |
| 2014/0164573 | A1* | 6/2014 | Hsiao | G06F 17/30129 709/219 |
| 2014/0330935 | A1* | 11/2014 | Malinowski | H04L 67/06 709/219 |

FOREIGN PATENT DOCUMENTS

| CN | 102170440 A | 8/2011 |
| CN | 102693164 A | 9/2012 |
| CN | 102882928 A | 1/2013 |
| CN | 202663441 U | 1/2013 |
| CN | 103026656 A | 4/2013 |
| CN | 103873543 A | 6/2014 |
| TW | 201403504 A | 1/2014 |
| TW | 201443660 A | 11/2014 |

* cited by examiner

*Primary Examiner* — Eleni A Shiferaw
*Assistant Examiner* — Hee K Song
(74) *Attorney, Agent, or Firm* — ScienBiziP, P.C.

(57) ABSTRACT

A cloud agent device including, determines whether the size of the file is less than the size of the remaining capacity of the second cloud storage, validating the verification request information of correctness, sending a affirmative notification to the first cloud storage and transfer the file from the first cloud storage to the second cloud storage when the verification request information is correct. The invention also provides a cloud storage and a file transferring method. The cloud agent device, cloud storage and file transferring method can efficient and accurate transfer of files in a safe condition.

20 Claims, 6 Drawing Sheets

US 10,187,469 B2

CLOUD AGENT DEVICE, CLOUD STORAGE AND FILE TRANSFERRING METHOD

CROSS-REFERENCE TO RELATED APPLICATIONS

This application claims priority to Taiwanese Patent Application No. 103141695 filed on Dec. 2, 2014, the contents of which are incorporated by reference herein.

FIELD

The present disclosure generally relates to cloud storage technology

BACKGROUND

At present, free cloud storage services are provided for file uploading and downloading. However, capacities of cloud storage devices provided by different manufacturers are limited. When a user have registered cloud storage services from various cloud storage providers, he must know which cloud storage device files are uploaded and worries if the capacity of one of the cloud storage devices is full. Thus, it is convenient for users to manage the files on the cloud storage devices and the capacities of the cloud storage devices. In addition, complicated user authentication is required when a file transferring is raised.

On the other hand, user accounts and passwords are required for different cloud storage platforms when a file transferring between the cloud storage platforms is performed. Security issue is consequentially raised if one of cloud storage platforms stores the user accounts and passwords of the other cloud storage platforms. Therefore, it is an important object to develop a method for file transferring without storing the user accounts and passwords of the cloud storage platforms.

BRIEF DESCRIPTION OF THE DRAWINGS

Implementations of the present technology will now be described by way of example only with reference to the attached figures.

DETAILED DESCRIPTION

Figure 1:
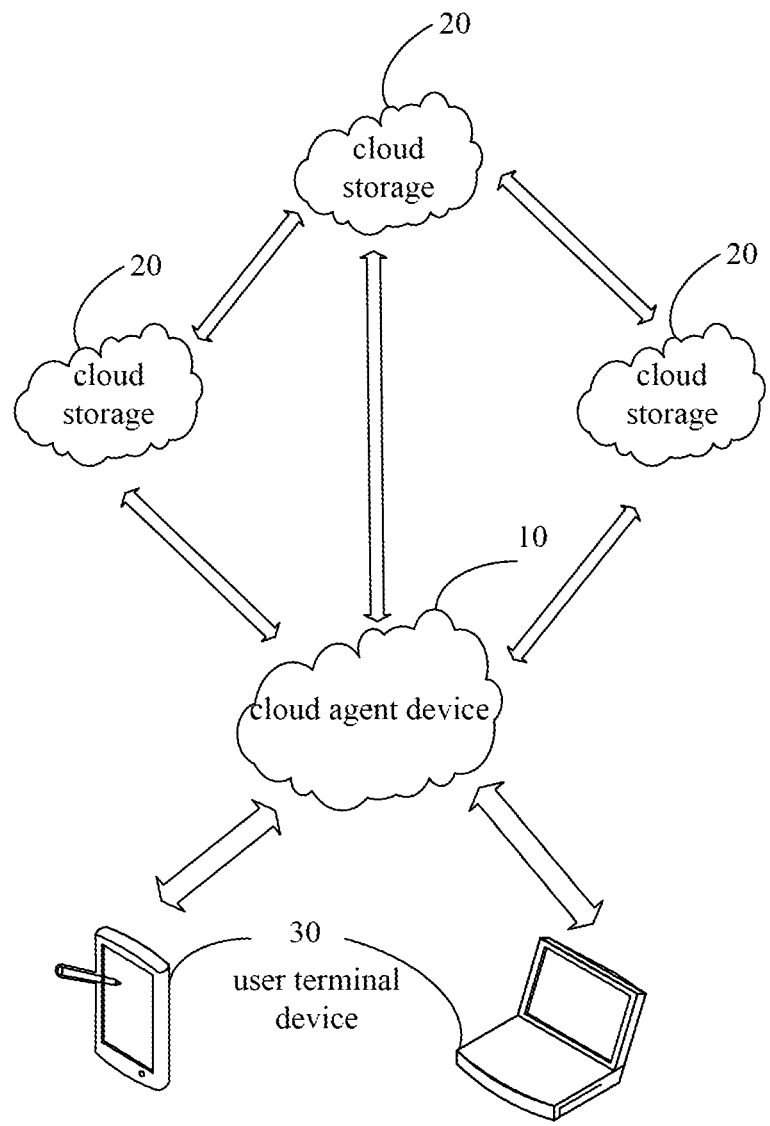
FIG. 1 illustrates an application environment of an embodiment of a cloud agent device and a cloud storage.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates an application environment of an embodiment of a cloud agent device 10 and a cloud storage set 20. In the illustrated embodiment, the cloud agent device 10 has functions of file management, file proxying file storing for the cloud storage 20. The cloud storage set 20 includes a number of cloud storage devices, the main function of the cloud storage set 20 is to store files, share files and transfer files. Popular cloud storage providers include the BAIDU cloud storage, the Kingsoft disk, the Fast enough ONEDRIVE the Cloudlet and so on. In one embodiment, before the cloud agent device 10 performs file managing, proxying and storing to the files of the cloud storage set 20, user accounts and passwords of each of the cloud storage devices of the cloud storage set 20 must be obtained. The cloud agent device 10 receives an instruction for a file transferring from an application of a user terminal device 30, the user terminal device, logins to the each of the cloud storage devices of the cloud storage set 20 and obtains user accounts and passwords of each of the cloud storage devices, and, meanwhile, retrieves metadata of the cloud storage 20.

In one embodiment, whether a file is needed to be transferred between the cloud storage devices of the cloud storage set 20 is user-defined. When a file has to be transferred from a cloud storage to another, a file transferring request is sent from the application of the user terminal device 30 to the cloud agent device 10. When receiving the file transferring request, the cloud agent device 10 logs in the cloud storage set 20 and checks remaining capacities of each of the cloud storage devices.

In one embodiment, the cloud agent device 10 updates metadata of each of the cloud storage devices of the cloud storage set 20 when the file transferring is completed.

Figure 2:
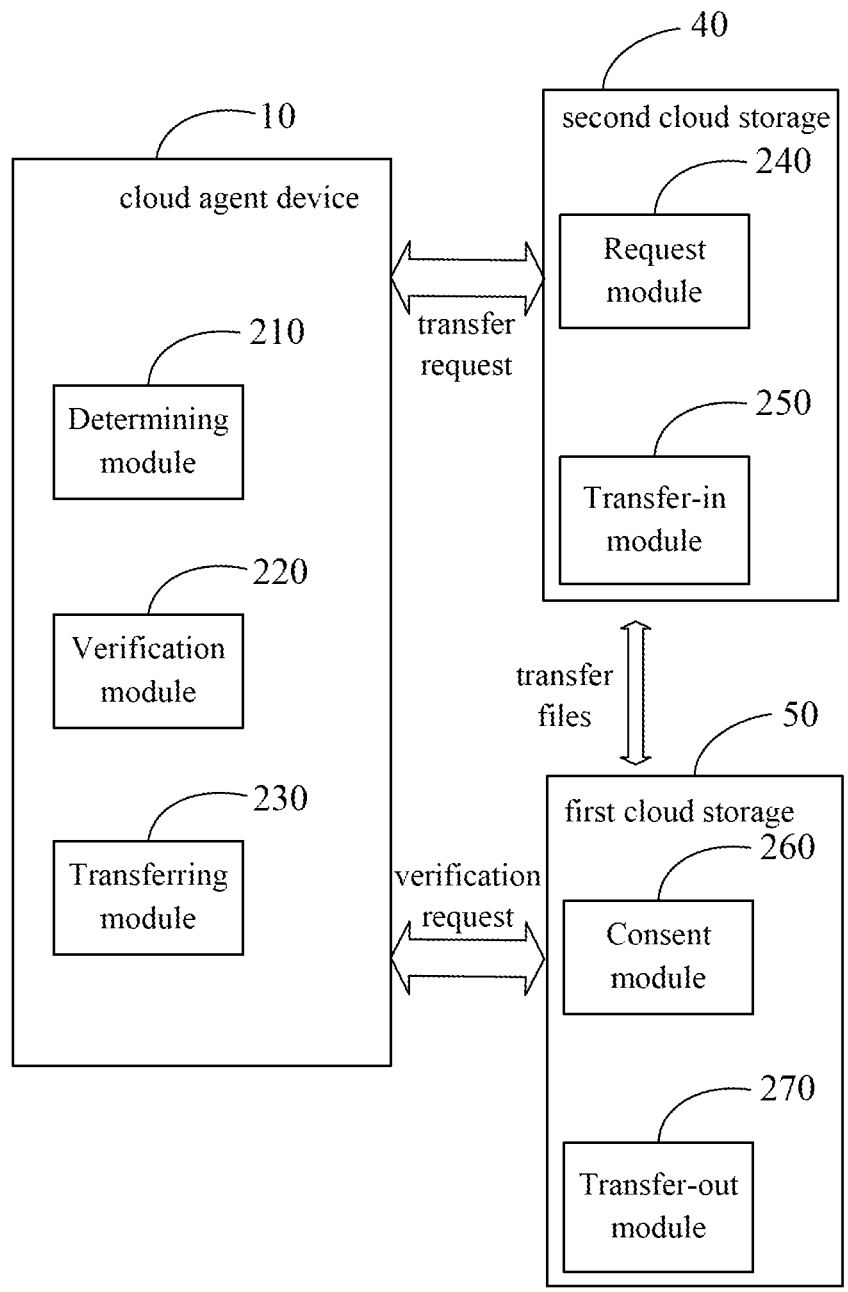
FIG. 2 illustrates a block diagram of an embodiment of a function of a cloud agent device and a cloud storage.

FIG. 2 illustrates a block diagram of an embodiment of functional blocks of the cloud agent device 10 and the cloud storage set 20. In one embodiment, the cloud agent device 10 includes a determining module 210, a verification module 220 and a transferring module 230. A second cloud storage 40 includes a request module 240 and a transfer-in module 250. A first cloud storage 50 includes a consent module 260 and a transfer-out module 270. The cloud agent device 10 enables a file to be transferred from the first cloud storage 50 to the second cloud storage 40. It is noted that the second cloud storage 40 and the first cloud storage 50 belongs to the cloud storage set 20. That is to say, the second cloud storage 40 also includes a consent module 260 and a transfer-out module 270. The first cloud storage 50 also includes a request module 240 and a transfer-in module 250.

In one embodiment, the cloud agent device 10, the second cloud storage 40 and the first cloud storage 50 of the function module perform corresponding functions to process the file transferring when the cloud agent device 10 receives the instruction for file transferring from the user terminal device 30.

Figure 4:
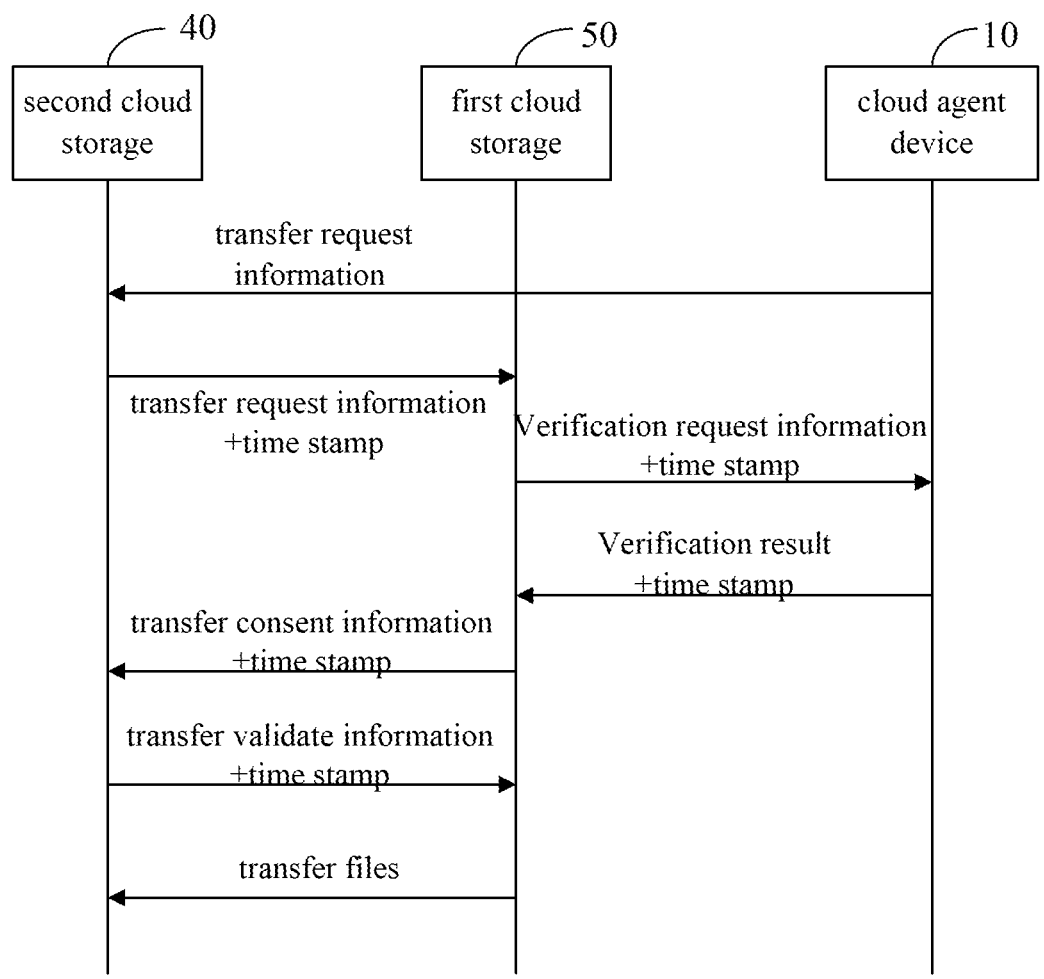
FIG. 4 illustrates a diagrammatic sketch of an embodiment of file transferring between a cloud agent device and a cloud storage.

In one embodiment, when receiving the instruction, the cloud agent device 10 logins to the second cloud storage 40 and the first cloud storage 50 and determines whether the size of a file to be transferred is less than a threshold value. The threshold value is equal to the remaining capacity of the second cloud storage 40. A file rejecting information is sent to the user terminal device 30 when the size of the file is not less than the size of the remaining capacity of the second cloud storage 40. A transfer request information is sent to the second cloud storage 40 when the size of the file is less than the size of the remaining capacity of the second cloud storage 40. The transfer request information includes a user login account of the user terminal device 30, a name of the file and a request token. Referring to FIG. 4, an embodiment of the cloud agent device 10 transferring the file from the first cloud storage 50 to the second cloud storage 40 is illustrated.

FIG. 4 illustrates a diagrammatic sketch of an embodiment of transfer the file between the cloud agent device 10 and the cloud storage set 20. The determining module 210 sends a transfer request information to the second cloud storage 40 when the size of the file is less than the size of the remaining capacity of the second cloud storage 40.

The transfer request information and the time stamp are transmitted to the first cloud storage 50 when the request module 240 of the second cloud storage 40 receives the transfer request information. The transfer request information needs to be sent within the time stamp and is encrypted by a digital signature. The time stamp is a time period, for example, 10 minutes or 30 minutes, which is set up in order to prevent hacker counterfeit for the transfer request information. The length of the time stamp can be user-defined according to the size and importance of the file. The digital signature process is encrypted to verified user identity.

The transfer request information is verified when the consent module 260 of the first cloud storage 50 receives the transfer request information. A verification request information and a time stamp are transmitted to the cloud agent device 10. The verification request information includes the name of second cloud storage 40 and the request token.

The transfer request information is verified when the validate module 220 of the cloud agent device 10 receives the verification request information.

The transfer module 230 sends a negative notification to reject the file transferring from the first cloud storage 50 to the second cloud storage 40 when the verification result is incorrect. The transfer module 230 sends an affirmative notification and the time stamp to the first cloud storage 50 in order to transfer the file from the first cloud storage 50 to the second cloud storage 40 when the verification result is correct.

When the consent module 260 of the first cloud storage 50 receives the verification result, the file is rejected to be transferred when the verification result is incorrect. A transfer consent information and the time stamp is sent to the second cloud storage 40 when the verification result is correct. The transfer consent information includes a verification result of the transfer request information and a request token.

The transfer validate information and a time stamp are sent to the first cloud storage 50 according to the transfer consent information when the transfer-in module 250 of the second cloud storage 40 receives the transfer consent information. The transfer verification information includes a user login account, a name of the file and a request token.

The file is sent to the second cloud storage 40 when the transfer-outside module 270 of the first cloud storage 50 receives the transfer validate information.

The file transferring operation is complete when the transfer-inside module 250 of the second cloud storage 40 receives the file.

The file determination and transferring is complete after a series of operations is performed by the function modules of the cloud agent device 10, the first cloud storage 50 and the second cloud storage 40.

Figure 3:
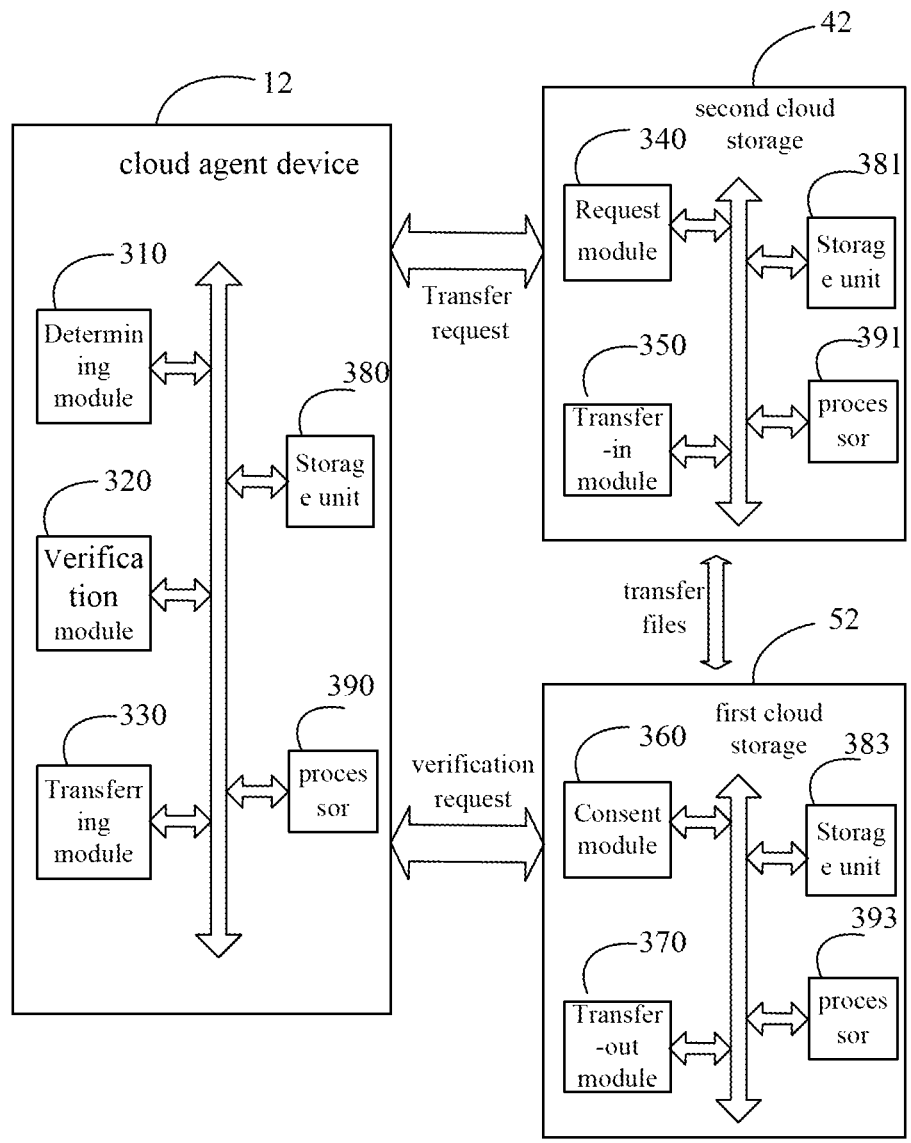
FIG. 3 illustrates a block diagram of another embodiment of a function of a cloud agent device and a cloud storage.

FIG. 3 illustrates a block diagram of another embodiment of a function of the cloud agent device 10 and the cloud storage set 20. In one embodiment, the cloud agent device 12 includes a determining module 310, a verification module 320 and a transferring module 330. A second cloud storage 42 includes a request module 340 and a transfer-in module 350. A first cloud storage 52 includes a consent module 360 and a transfer-out module 370. All the function modules are the same as mentioned FIG. 2. One or more of the function modules include computerized codes in the form of one or more programs that are stored in a storage unit 380, a storage unit 381 and a storage unit 383 and are executed by a processor 390, a processor 391 and a processor 393 to provide functions of the cloud agent device and the cloud storage set. The storage unit 380, the storage unit 381 or the storage unit 383 can be a dedicated memory, such as an EPROM or a flash memory.

Figure 5:
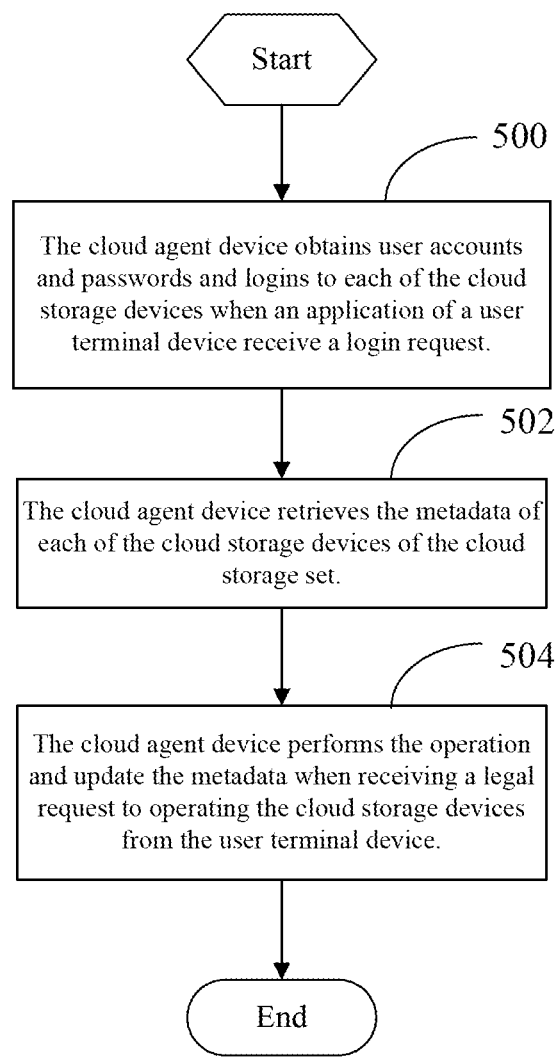
FIG. 5 illustrates a flowchart of an embodiment of a cloud agent device log on each cloud storage obtain account password.

FIG. 5 illustrates a flowchart of an embodiment of a cloud agent device log on each cloud storage obtain account password. The method is used in the cloud agent device 10 of the FIG. 1.

In one embodiment, before transferring the file between the cloud storage platforms, the cloud agent device have to obtain the user accounts and passwords of each of the cloud storage devices of the cloud storage set. The cloud agent device logins to the each of the cloud storage and obtains the user accounts and passwords and, meanwhile, updates metadata of the cloud storage devices in real time.

At block 500, the cloud agent device obtains user accounts and passwords and logins to each of the cloud storage devices when an application of a user terminal device receive a login request.

At block 502, the cloud agent device retrieves the metadata of each of the cloud storage devices of the cloud storage set.

At block 504, the cloud agent device performs the operation and update the metadata when receiving a legal request to operating the cloud storage devices from the user terminal device.

Figure 6:
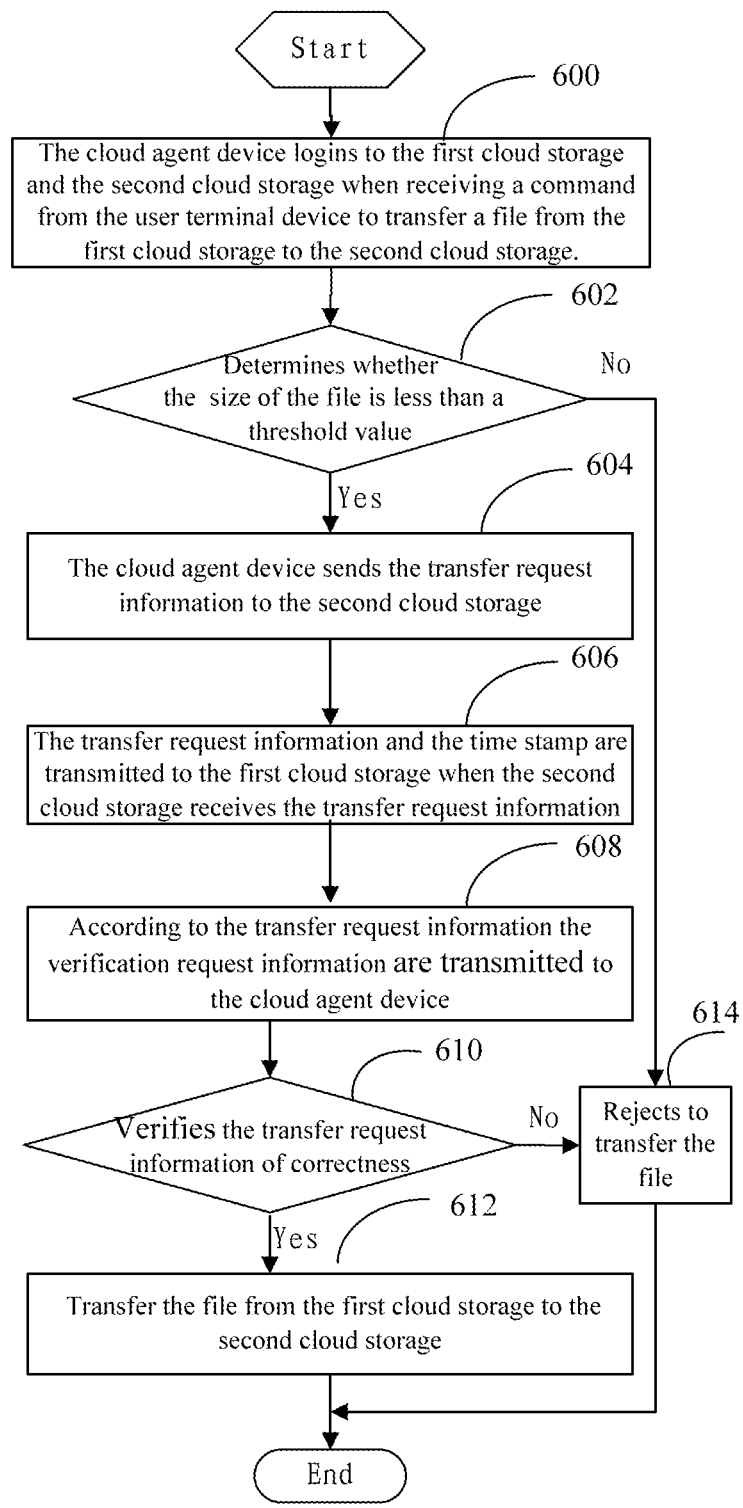
FIG. 6 illustrates a flowchart of an embodiment of a transfer files method.

FIG. 6 illustrates a flowchart of an embodiment of a file transferring method. In one embodiment, the file transferring method is provided by way of example, as there are a variety of ways to carry out the method. The method described below can be carried out using the configurations illustrated in FIG. 2 and FIG. 3, for example, and various elements of these figures are referenced in explaining the processing method. Each block shown in FIG. 3 represents one or more processes, methods, or subroutines, carried out in the exemplary processing method. Additionally, the illustrated order of blocks is by example only and the order of the blocks can change. The file transferring method can begin at block S600.

The cloud agent device obtains user accounts and passwords of each of the cloud storage devices for file managing, proxying and storing when the transfer request information is received from the user terminal device.

In one embodiment, whether transfer the file is to be set by the user according to their own needs, if a user want to transfer a file from the first cloud storage to the second cloud storage. An application of the user terminal device 30 sends a transfer request information to the cloud agent device. This will be processed according to the corresponding needs when the cloud agent device receives the transfer request information.

At block S600, the cloud agent device logins to the first cloud storage and the second cloud storage when receiving a command from the user terminal device to transfer a file from the first cloud storage to the second cloud storage.

At block S602, the cloud agent device determines whether the size of the file is less than a threshold value. The threshold value is equal to the size of the remaining capacity of the second cloud storage. The process proceeds to block S614 when the size of the file is not less than the size of the remaining capacity of the second cloud storage. The process proceeds to block S604 when the size of the file is less than the size of the remaining capacity of the second cloud storage.

At block S604, the cloud agent device sends the transfer request information to the second cloud storage. The transfer request information includes a user login account of the user terminal device, a name of the transfer file and a request token.

At block S606, the transfer request information and the time stamp are transmitted to the first cloud storage when the second cloud storage receives the transfer request information. The transfer request information must be transferred within the time stamp. The time stamp is a time period, for example, 10 minutes or 30 minutes, which is user-defined in order to prevent hacker counterfeit. The length of the time stamp is user-defined according to the size and importance of the file.

At block S608, the transfer request information is verified when the first cloud storage receives the transfer request information. The verification request information and a time stamp are transmitted to the cloud agent device. The verification request information includes the name of first cloud storage and the request token.

At block S610, the cloud agent device verifies the transfer request information and sends the verification result to the first cloud storage. The process proceeds to block S612 when the verification result is correct. The process proceeds to block S614 when the verification result is incorrect.

At block S612, the first cloud storage sends a transfer consent information to the second cloud storage by the time stamp, sends the file to the second cloud storage, when the first cloud storage verifies the transfer consent information, and returns a verification information. The transfer consent information includes a verification result of the transfer request information and a request token. The transfer verification information includes a user login account, a name of the file and a request token.

At block S614, the first cloud storage rejects to transfer the file to the second cloud storage.

After the capacities of the cloud storage devices are determined, the files can be fastly and safely transferred between the cloud storage devices.

The file transferring method of the present disclosure determines whether the capacity of the cloud storage device is insufficient and, if so, transfers the file. The cloud agent device, the cloud storage and the file transferring method verify the cloud storage devices under a security condition and fastly complete the file transferring process between the cloud storage devices. Furthermore, the cloud agent device also stores excess files and transfers the files to the cloud storage devices.

The embodiments shown and described above are only examples. Many details are often found in the art such as the other features of a cloud agent device, a cloud storage and a file transferring method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A cloud agent device, applied to transfer a file from a first cloud storage to a second cloud storage, the cloud agent device comprising:
   at least one processor;
   a storage system; and
   one or more programs that are stored in the storage system and executed by the at least one processor, the one or more programs comprising instructions for:
   receiving a command from a user terminal device to transfer a file from the first cloud storage to the second cloud storage;
   logging to the first cloud storage and the second cloud storage and determining whether a size of the file is less than a size of the remaining capacity of the second cloud storage;
   sending transfer request information to the second cloud storage when the size of the file is less than the size of the remaining capacity of the second cloud storage, wherein the transfer request information and a time stamp are sent to the first cloud storage and verification request information is sent to the cloud agent device according to the transfer request information, wherein the transfer request information is transferred within the time stamp to prevent hacker counterfeit, and a length of the time stamp is user-defined according to the size and importance of the file;
   receiving the verification request information and determining whether the verification request information is correct; and
   sending an affirmative notification to the first cloud storage and transfer the file from the first cloud storage to the second cloud storage when the verification request information is correct.

2. The cloud agent device as claimed in claim 1, further comprising instructions for:
sending a negative notification to the first cloud storage when the size of the file is greater than or equal to the size of the remaining capacity of the second cloud storage.

3. The cloud agent device as claimed in claim 1, further comprising instructions for:
sending a negative notification to the first cloud storage when the verification request information is incorrect, and rejecting to transfer the file from the first cloud storage to the second cloud storage.

4. The cloud agent device as claimed in claim 3, wherein the transfer request information includes a user login account of the user terminal device, a name of the file and a request token.

5. The cloud agent device as claimed in claim 4, wherein the verification request information includes the name of the second cloud storage and the request token.

6. A cloud storage, the cloud storage in communication with a cloud agent device and another cloud storage, the cloud storage comprising:
at least one processor;
a storage system; and
one or more programs that are stored in the storage system and executed by the at least one processor, the one or more programs comprising instructions for:
sending transfer request information and a time stamp to the another cloud storage when receive the transfer request information from the cloud agent device, wherein the another cloud storage according to the transfer request information sends a verification request information to the cloud agent device for determining whether the transfer request information is correct, and sends a transfer consent information if the verification request information is correct, wherein the transfer request information is transferred within the time stamp to prevent hacker counterfeit, and a length of the time stamp is user-defined according to the size and importance of the file; and
sending a transfer validate information to the another cloud storage according to the transfer consent information, and receiving the file from the another cloud storage.

7. The cloud storage as claimed in claim 6, further comprising instructions for:
according to the transfer request information, sending a verification request information to the cloud agent device for determining whether the transfer request information is correct when receiving the transfer request information from the another cloud storage, and sending the transfer consent information to the another cloud storage when the verification request information is correct; and
sending the file to the another cloud storage according to the transfer validate information which is received from the another cloud storage.

8. The cloud storage as claimed in claim 7, further comprising instructions for:
rejecting to transfer the file when the verification request information is incorrect.

9. The cloud storage as claimed in claim 7, wherein the transfer consent information includes a verification result of the transfer request information and a request token.

10. The cloud storage as claimed in claim 9, wherein the transfer validate information includes a user login account, a name of the file, and a request token.

11. A file transferring method, applied to a cloud agent device, the method comprising:
receiving a command from a user terminal device to transfer a file from a first cloud storage to a second cloud storage;
logging to the first cloud storage and the second cloud storage and determining whether a size of the file is less than a size of the remaining capacity of the second cloud storage;
sending transfer request information to the second cloud storage when the size of the file is less than the size of the remaining capacity of the second cloud storage, wherein the transfer request information and a time stamp are sent to the first cloud storage and verification request information is sent to the cloud agent device according to the transfer request information, wherein the transfer request information is transferred within the time stamp to prevent hacker counterfeit, and a length of the time stamp is user-defined according to the size and importance of the file;
receiving the verification request information and determining whether the verification request information is correct; and
sending an affirmative notification to the first cloud storage and transfer the file from the first cloud storage to the second cloud storage when the verification request information is correct.

12. The method as claimed in claim 11, further comprising:
sending a negative notification to the first cloud storage when the size of the file is greater than or equal to the size of the remaining capacity of the second cloud storage.

13. The method as claimed in claim 11, further comprising:
sending a negative notification to the first cloud storage when the verification request information is incorrect, and rejecting to transfer the file from the first cloud storage to the second cloud storage.

14. The method as claimed in claim 13, wherein the transfer request information includes a user login account of the user terminal device, a name of the file and a request token.

15. The method as claimed in claim 14, wherein the verification request information includes the name of the second cloud storage and the request token.

16. A file transferring method, comprising:
sending transfer request information and a time stamp to cloud storage when receiving the transfer request information from a cloud agent device, wherein the cloud storage according to the transfer request information sends a verification request information to the cloud agent device for determining whether the transfer request information is correct, and sends a transfer consent information when the verification request information is correct wherein the transfer request information is transferred within the time stamp to prevent hacker counterfeit, and a length of the time stamp is user-defined according to a size and importance of a file; and
sending a transfer validate information to the cloud storage according to the transfer consent information, and receiving the file from the cloud storage.

17. The method as claimed in claim 16, further comprising:
according to the transfer request information sending a verification request information to the cloud agent device for determining whether the transfer request information is correct when receiving the transfer request information from the cloud storage, and sending the transfer consent information to the cloud storage when the verification request information is correct; and sending the file to the cloud storage according to the transfer validate information which is received from the cloud storage.

18. The method as claimed in claim 17, further comprising:

rejecting to transfer the file when the verification request information is incorrect.

19. The method as claimed in claim 17, wherein the transfer consent information includes a verification result of the transfer request information and a request token.

20. The method as claimed in claim 19, wherein the transfer validate information includes a user login account, a name of the file, and a request token.

* * * * *